March 17, 1959 W. M. S. THOMPSON 2,878,077
AUXILIARY BRAKE RELEASE DEVICE FOR
RAILWAY AIR BRAKE SYSTEMS
Filed June 12, 1956 3 Sheets-Sheet 1
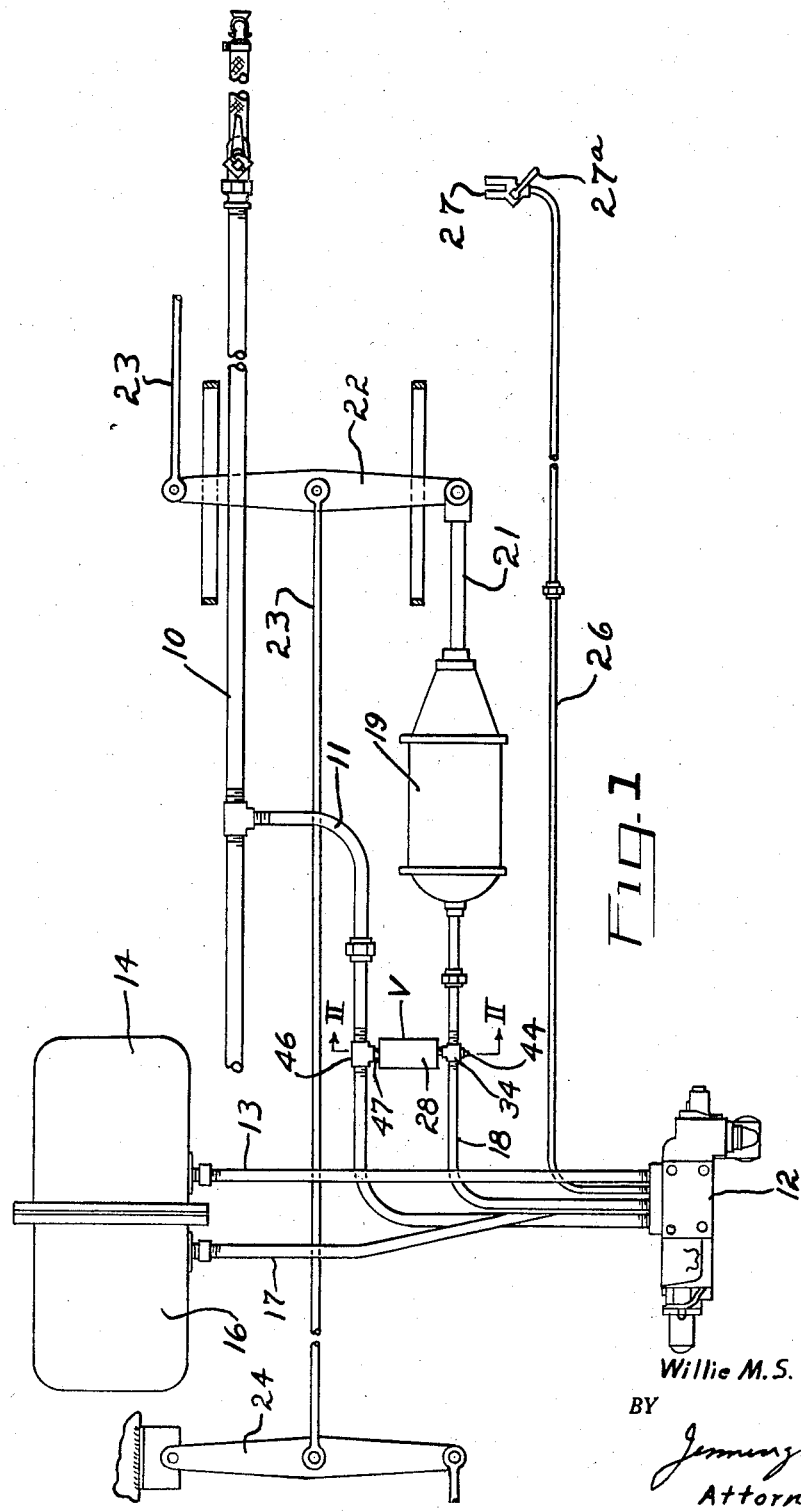
INVENTOR.
Willie M.S. Thompson
BY
Jennings & Carter
Attorneys March 17, 1959
W. M. S. THOMPSON
2,878,077
AUXILIARY BRAKE RELEASE DEVICE FOR
RAILWAY AIR BRAKE SYSTEMS
Filed June 12, 1956
3 Sheets-Sheet 2
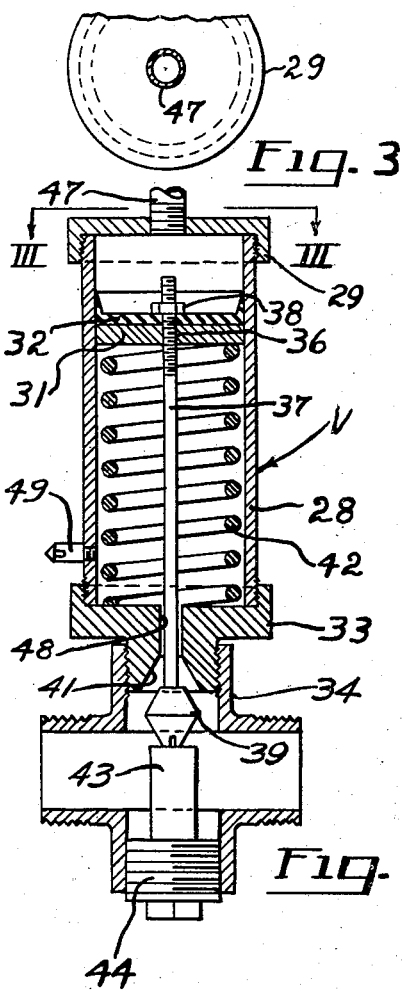
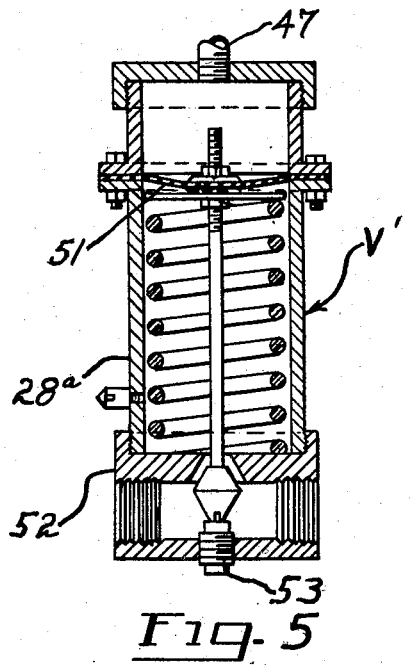
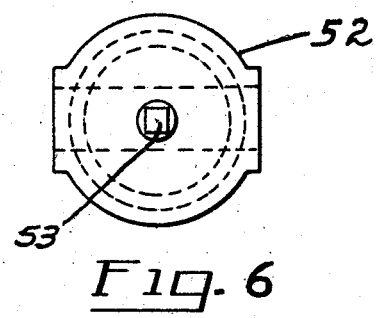
INVENTOR.
Willie M.S. Thompson
BY
Jennings & Carter
Attorneys March 17, 1959
W. M. S. THOMPSON
2,878,077
AUXILIARY BRAKE RELEASE DEVICE FOR
RAILWAY AIR BRAKE SYSTEMS
Filed June 12, 1956
3 Sheets-Sheet 3
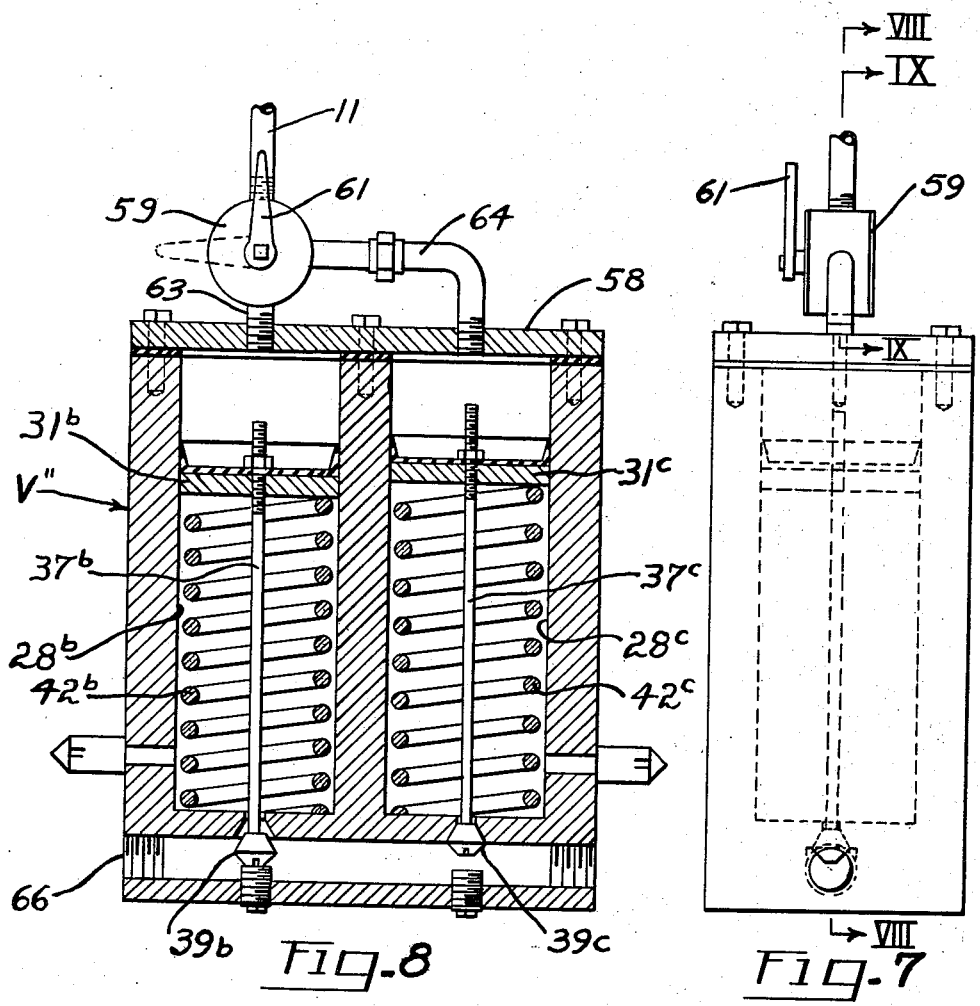
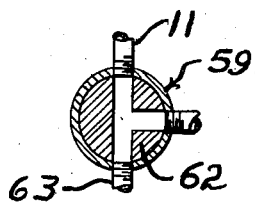
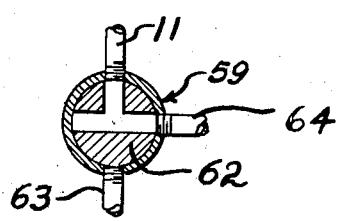
INVENTOR.
Willie M. S. Thompson
BY
Jennings & Carter
Attorneys United States Patent Office 2,878,077
Patented Mar. 17, 1959

2,878,077

AUXILIARY BRAKE RELEASE DEVICE FOR RAILWAY AIR BRAKE SYSTEMS

Willie M. S. Thompson, Miami, Fla., assignor to Safe-T-Systems, Corp., a corporation of Florida Application June 12, 1956, Serial No. 590,848

3 Claims. (Cl. 303—68)

This invention relates to an auxiliary valve which is adapted to be applied to the brake systems of railway cars, both freight and passenger.

In the art to which this invention relates it is well known that faulty triple valves, faulty retainer valves and the like often cause the brakes of railroad cars to stick or fail to release after they have been applied. Sticking of brakes results in overheating of the wheels, excessive wear of the brake shoes, flat wheels, thermos crack wheels, brake burn, shell out wheels and other serious consequences which will be apparent to those skilled in the art. It is well known also that the major difficulties encountered with present day railway brake systems lies, not in the application of the brakes, but in the positive, complete and timely disengagement of the brakes in response to reestablishing of pressure in the train line.

With the foregoing in mind the prime object of my invention is to provide an auxiliary valve which may be placed on a railway car, between the train line and the brake cylinder branch line, my improved valve being so constructed and arranged that immediately, upon reestablishing pressure in the train line after the brakes have been applied, any air in the brake cylinder will be immediately vented, permitting the spring in the brake cylinder to release the brakes.

Another object of my invention is to provide a simple, positively acting auxiliary valve of the character designated which may be so associated in the system relative to the triple valve that the air employed to apply the brakes is immediately released upon reestablishment of pressure in the train line, regardless of malfunctioning, slowness in functioning, or partial functioning of the triple valve.

Another object is to provide an auxiliary valve having the features just mentioned which also is effective to eliminate the adverse effects of malfunctioning or non-functioning of the retaining valve whereby, simultaneously, my improved valve assures that the brakes will be quickly and fully released upon failure either of the triple valve or of the retaining valve.

A further object of my invention is to provide an auxiliary valve of the character designated which functions independently in each individual brake system of each individual car of a train, whereby rolling stock may be equipped with my invention one car at a time, without the necessity of having to make a change over of all cars in a given train at one time.

A still further object is to provide a valve embodying the features of my invention and which is capable of functioning at different pressures, that is, a valve which may be applied to a car whereby the valve functions if the car is used at a train line pressure of around 70 pounds, or at higher pressures of around 110 pounds customarily used on passenger train brake systems.

Briefly, my invention comprises a pressure responsive valve which is spring biased toward closed position. The pressure responsive part of my improved valve has a pressure connection to the branch line leading from the train line to the triple valve. This pressure connection is effective to force the diaphragm or piston of the device toward a position to open the valve. My improved valve is connected also to the brake cylinder branch line which connects the brake cylinder to the triple valve. Thus, whenever the train line pressure is at its maximum my improved valve is open, that is, it opens the brake cylinder branch line to atmosphere. When the pressure in the train line is reduced a predetermined amount my improved valve immediately closes, whereupon pressure from the auxiliary reservoir is supplied through the triple valve to the brake cylinder, thus applying the brakes. As soon as the pressure in the train line is brought back to its normal maximum train line pressure the valve opens again, immediately venting the brake cylinder to atmosphere, thus releasing the brakes even though the triple valve may be stuck or may in some other way fail properly to operate. The foregoing advantages likewise apply in the event the retaining valve is in use. By proper selection of the spring in my apparatus I can make it substantially as sensitive as desired. In practice I so select the spring that the valve opens at approximately 3 pounds less than train line pressure.

Apparatus illustrating the features of my invention is shown in the accompanying drawings forming a part of this application, in which:

Fig. 1 is a somewhat diagrammatic view of a standard railway car brake system showing my invention applied thereto;

Fig. 2 is an enlarged detail sectional view taken generally along line II—II of Fig. 1;

Fig. 3 is a fragmental sectional view taken generally along line III—III of Fig. 2;

Fig. 4 is a bottom view of the valve shown in Fig. 2;

Fig. 5 is a longitudinal sectional view through a slightly modified form of apparatus;

Fig. 6 is a bottom plan view of the valve shown in Fig. 5;

Fig. 7 is an end elevational view of another modified form of my invention which may be used in brake systems which are to operate either upon high or low train line pressure;

Fig. 8 is a detail sectional view taken generally along line VIII—VIII of Fig. 7;

Fig. 9 is a detail sectional view taken generally along line IX—IX of Fig. 7; and Fig. 10 is a view similar to Fig. 9 and showing the selector valve of Figs. 7 and 8 in the position to connect the train line pressure to one of the cylinders of the valve shown in Figs. 7 and 8.

Referring now to the drawings for a better understanding of my invention and more particularly to Figs. 1 to 4 inclusive, I will describe my invention in association with a standard railway brake system. Thus, the system includes the brake pipe or train line 10, connected by a branch pipe 11 to a triple valve 12. In the manner well understood there also is connected to the triple valve through a line 13 an auxiliary reservoir 14. An emergency reservoir 16 is connected to the triple valve through a line 17. Leading from one of the connections to the triple valve 12 is a pipe 18 which is connected to the pressure end of a brake cylinder 19. The piston 21 of the brake cylinder 19 is connected to a floating lever 22. Brake rods 23 are pivotally connected to the lever in the manner understood and they in turn are pivotally connected to pivoted levers 24. It will be understood that when air is admitted to the brake cylinder 19 the brakes of the railway car carrying the system are applied. Leading from the triple valve is a line 26 on the end of which is the usual retaining valve 27. The retaining valve serves the purpose of retaining air pressure in the brake cylinder wherever it is desired to hold brakes applied as when descending grades and is manually operable through a handle 27a as is well understood.

My invention consists of the pressure responsive valve apparatus indicated generally by the letter V adapted for incorporation in the system as will now be explained. Referring now particularly to Fig. 2, the apparatus V embodies a housing 28 closed at its upper end by means of a cap 29. Inside the cylinder 28 is a piston 31 which carries a seal 32. The cylinder 28 may be screwed into a bottom fitting 33 which in turn may carry a cross 34 on its lower end.

The piston 31 is threaded onto the upper threaded portion 36 of a piston rod 37. A lock nut 38 holds the piston in adjusted position on the piston rod. At its lower end the piston rod carries a valve closure 39. A seat 41 is provided in the fitting 33. A coil spring 42 serves to bias the piston 31 and hence the closure 39 upwardly whereby, as will be explained, the closure may seat against the seat 41 with substantially an air tight fit. In order to adjustably limit downward movement of the piston and rod and valve closure assembly, I may provide a stop member 43 which is mounted on a plug 44 screwed into the leg of the cross opposite the leg secured to the fitting 33.

It will be seen that the cross 34 is connected to the brake cylinder branch line 18 whereas the upper end of the cylinder 28, namely the end thereof opposite spring 42, is connected through a T 46 and a nipple 47 to the train line branch 11.

With the parts assembly as just described it will be seen that by proper selection of the spring 42 closure 39 will, when a certain pressure exists in the train line, move away from seat 41. The brake cylinder 19 thus is vented through the opening 48, thence to atmosphere through an air whistle 49 mounted in communication with the lower end of cylinder 28. The spring 42 is selected to open the valve 39 when the pressure in the train line 10 is approximately 3 pounds less than normal maximum train line pressure.

The operation of the system embodying my improved valve is as follows:

Assuming the brake line pressure in line 10 to be at the normal maximum, for instance, 70 pounds, it will be apparent that the piston 31 is in its lower position with the valve closure 39 resting against stop 43. In this position and assuming the triple valve to be in release position the brake cylinder 19 is vented to atmosphere as has just been explained. Assuming that it is desired now to apply the brakes, the engineer in the locomotive reduces pressure in the train line 10 as is customary. As soon as this pressure reaches say 67 pounds, spring 42 overcomes the pressure in the top of cylinder 28, seating the closure 39 air tight against seat 41. Movement of the triple valve in normal operation thus establishes connection between the auxiliary reservoir 14 and the brake cylinder 19. When the pressure in the train line is restored to normal to release the brakes, piston 31 and valve 39 are moved by the train line pressure to the position shown in Fig. 2, thereby venting the brake cylinder.

As will be understood, assuming the trple valve 12 to be operating properly and the retaining valve to be fully open, air from the brake cylinder 19 normally would be vented through line 18, triple valve 12 and to atmosphere through line 26 and valve 27. However, in the event of failure of operation of the triple valve, with the brakes applied, it will be seen that my improved apparatus bypasses both the triple valve 12 and the retaining valve. Assuming that the retaining valve 27 of the car in question is moved to pressure retaining position, as for instance for descending grades, it will be readily apparent that my invention permits the auxiliary reservoir to be recharged up to a pressure almost to full train line pressure. Thus, and by way of example, if the pressure retaining valve were set to retain 20 pounds pressure in the system, closure 39 would be seated against the seat 41, thus maintaining the system closed, until the pressure in the train line reaches nearly maximum pressure. In effect, the use of my improved valve in a brake system of the character designated protects the system against malfunctioning or nonfunctioning of both the triple valve and retaining valve without in any way affecting the holding feature of the retaining valve.

In Figs. 5 and 6, I show a slightly modified form of my invention which I designate generally by the letter V'. In this instance I have replaced the piston 31 and gasket 32 of the previous modification with a diaphragm 51. Likewise, the lower fitting 52 at the bottom end of the cylinder 28a may be a casting and the stop may be in the form of a threaded plug 53. However, in all other respects it will be apparent that the modification shown in Figs. 5 and 6 is substantially identical with the one already described and that it functions in substantially the identical way already set forth in detail.

In Figs. 7 to 10 inclusive I show a still further modified form of my invention which is especially adapted to a brake system which is to operate on train line pressures of different values. It sometimes is desirable to incorporate a car either in a freight train or in a passenger train. Since the customary passenger train line pressure is considerably higher than the pressure used for freight train service to adapt my invention to such cars I employ the modified form now to be described which will function upon either pressure, selectively.

In Figs. 7 to 10 inclusive the modification V" consists of a housing having two cylinders 28b and 28c therein. In the cylinders 28b and 28c are pistons 31b and 31c, piston rods 37b and 37c, and valve closures 39b and 39c, all these parts corresponding to the parts shown in Figs. 2 and 4. The upper ends of the cylinders are sealed fluid tight by a closure member 58.

Mounted on top of the closure 58 is a three-way selector valve 59 having a manual operating handle 61 connected to the plug 62 thereof. See Figs. 9 and 10. The train branch line 11 is connected to the housing of the valve. One outlet of the valve 59 is connected through a nipple 63 to cylinder 28b. The other outlet connection from the valve 59 is connected by a line 64 to cylinder 28c. Spring 42b is selected to cause the valve closure 39b to operate at the lower, freight train service pressure of say 70 pounds. Spring 42c is selected so that the closure 39c is opened at a pressure approximately 3 pounds below the maximum train line pressure used for passenger service, for example, about 107 pounds.

It will be understood that the apparatus V" is inserted in the system in place of the apparatus V or V' so that the common outlet connection 66 is connected in the line 18 leading to the brake cylinder 19 and so that the train line pressure leads to valve 59. With the device thus installed it will be apparent that with operating handle 61 in the full line position of Fig. 8, corresponding to the position shown in Fig. 9, the train line 11 is connected simultaneously to the upper ends of both cylinders 28b and 28c. This is the position of valve 59 when the car equipped with the device V" is to form a part of a freight train or low pressure system. In this case it will be apparent that the functioning of the valve already described in connection with Fig. 2 occurs, the stronger spring 42c simply holding the closure 39c seated at all times.

If the car in which the apparatus V" is installed is made up as a part of a passenger train in which the train line pressure is higher than freight train line pressure, for instance about 110 pounds, the operating handle is moved to opposite position from that shown in Fig. 8, that is to the position shown in Fig. 10. In the position just mentioned it will be apparent that the three way valve 59 disconnects cylinder 28b from the train line 11 and connects only cylinder 28c therewith. Closure 39b remains seated and cylinder 28b is inoperative. On the other hand, cylinder 28c and its associated parts together with closure 39c are fully effective to protect the brake system in the manner already explained.

From the foregoing it will be apparent that I have devised an improved auxiliary control valve for railway air brake systems. While it is possible to use my invention on relatively long trains with air tight connections in the train line the air brake system of the present invention is preferably used on relatively short trains. As before stated it will be apparent that my invention may be applied to one, some, or all of the individual cars of any given train. Thus, the brake releasing features of my invention are individual to and affect only each individual car on which my invention is installed. Therefore, brake systems of rolling stock may be equipped with my improved auxiliary valve as the cars are built or as they are brought to the shop without the necessity of having to equip large numbers of cars simultaneously. Further, it will be readily apparent that my invention is of such nature that in event of failure of the same, such as a failure of closure 39 to open or close, this would not be fatal to the operation of the brake system. For instance, if the valve closure 39, for some reason, fail to open, the brake system would function as if my invention were not present. On the other hand, my invention eliminates the serious consequences which always occur when the brakes fail to release at all. My improved valve mechanism can quite easily be adjusted to operate upon any pressure commonly used in railroad brake systems.

My invention also is particularly adapted for use on special rolling equipment such for instance as the individual cars of subways and the like. For this service the form of the invention shown either in Figs. 2 or 5 would be used.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an air brake system for a railway car including a train line, a triple valve operatively connected to said train line and a brake cylinder and auxiliary reservoir also operatively connected to said triple valve; an auxiliary brake release means arranged between and connecting said train line and said brake cylinder and responsive to fluid pressure in said train line, said brake release means comprising a cylinder operatively connected at one end thereof to said train line for receiving fluid pressure therefrom, the other end of said cylinder having a fitting thereon with a central aperture extending therethrough and terminating at a valve seat, a rod extending through said central aperture and being of a diameter substantially smaller than that of said central aperture so as to permit fluid exhaust pressure from said brake cylinder between said rod and the edges defining said aperture, said rod having fluid responsive means on one end thereof arranged within said cylinder and a valve on the other end thereof adapted for seating in said valve seat, spring means arranged within said cylinder and urging said valve towards closed position with a force less than the force created against said fluid responsive means by the normal maximum train line pressure, said cylinder having a vent to the atmosphere through a wall thereof and said brake cylinder thereby being vented to the atmosphere through said cylinder vent and central aperture when said valve is opened by normal maximum train line pressure.

2. In an air brake system for a railway car as defined in claim 1 and further characterized in that the fluid responsive means comprises a diaphragm forming one wall of a pressure chamber.

3. In an air brake system for a railway car, the combination of a train line operatively connected to a triple valve and a brake cylinder and auxiliary reservoir operatively connected to said triple valve; an auxiliary brake release means arranged between and connecting said train line and said brake cylinder and responsive to fluid pressure in said train line, said brake release means comprising a pair of cylinders selectively connected at one end thereof to said train line for receiving fluid pressure therefrom, each of said cylinders having a central aperture arranged at the other end thereof that terminates at a valve seat, a piston rod extending through said central apertures and being of a diameter substantially smaller than that of said aperture so that fluid exhaust pressure from said brake cylinder is permitted between said piston rod and the edges defining said aperture, said piston rod having a piston on one end thereof arranged within said cylinder and a valve on the other end thereof adapted for seating in said valve seat, spring means arranged within each of said cylinders and urging said valve towards closed position with a force less than the force created against the pistons by the normal maximum train line pressure, one of said valves being operable at a substantially lower train line pressure than the other valve, means for selectively exposing either of the pistons to train line pressure, and each of said cylinders having a vent to the atmosphere through a wall thereof whereby said brake cylinder is vented to the atmosphere through said cylinder vent and said aperture when either of the valves is opened by normal maximum train line pressure.

References Cited in the file of this patent
UNITED STATES PATENTS

| | | |
|---|---|---|
| 1,025,381 | Custer | May 7, 1912 |
| 1,276,036 | Culling | Aug. 20, 1918 |
| 1,276,049 | Finley | Aug. 20, 1918 |
| 2,025,847 | Campbell | Dec. 31, 1935 |